United States Patent [19]
Lee et al.

[11] Patent Number: 5,974,426
[45] Date of Patent: Oct. 26, 1999

[54] DEVICE AND METHOD FOR DATA RECOVERY IN A FILE SYSTEM

[75] Inventors: Gui-Jung Lee, Yongin; Jung-Gi Kim, Seoul, both of Rep. of Korea

[73] Assignee: SamSung Electronics Co., Ltd., Kyungi-do, Rep. of Korea

[21] Appl. No.: 08/910,778

[22] Filed: Aug. 13, 1997

[30] Foreign Application Priority Data

Aug. 13, 1996 [KR] Rep. of Korea ............ 96-33622

[51] Int. Cl.⁶ .................................................. G06F 17/30
[52] U.S. Cl. .......................... 707/202; 379/164; 379/165; 365/185.09; 371/30; 371/48
[58] Field of Search .................. 707/1–10, 100–104, 707/200–206; 365/185.01–185.09, 185.1, 185.11–183.19, 185.21–185.29; 711/103, 204; 370/389

[56] References Cited

U.S. PATENT DOCUMENTS

| 4,164,017 | 8/1979 | Randell et al. ............ 395/182.13 |
| 4,506,346 | 3/1985 | Bennett et al. ............ 711/115 |
| 4,595,800 | 6/1986 | Nagatomi et al. ............ 379/165 |
| 4,602,132 | 7/1986 | Nagatomi et al. ............ 379/159 |
| 4,703,416 | 10/1987 | Crupi et al. ............ 711/115 |
| 4,763,354 | 8/1988 | Fukushima et al. ............ 433/217.1 |
| 4,782,514 | 11/1988 | Oshikata et al. ............ 379/165 |
| 4,821,316 | 4/1989 | Okumura et al. ............ 379/156 |
| 5,029,125 | 7/1991 | Sciupac ............ 707/205 |
| 5,113,393 | 5/1992 | Kam et al. ............ 370/389 |
| 5,144,653 | 9/1992 | Masuoka ............ 379/113 |
| 5,251,254 | 10/1993 | Tanigawa et al. ............ 379/165 |
| 5,276,862 | 1/1994 | McCulley et al. ............ 395/182.13 |
| 5,291,589 | 3/1994 | Matsuura et al. ............ 395/182.13 |
| 5,339,426 | 8/1994 | Aoshima ............ 395/651 |
| 5,392,427 | 2/1995 | Barrett et al. ............ 707/205 |
| 5,432,927 | 7/1995 | Grote et al. ............ 395/652 |
| 5,465,292 | 11/1995 | Takahashi et al. ............ 379/164 |
| 5,471,523 | 11/1995 | Smith et al. ............ 379/165 |
| 5,504,883 | 4/1996 | Coverston et al. ............ 707/202 |
| 5,524,230 | 6/1996 | Sakaue et al. ............ 711/103 |
| 5,530,673 | 6/1996 | Tobita et al. ............ 365/185.09 |
| 5,561,795 | 10/1996 | Sarkar ............ 707/202 |
| 5,564,011 | 10/1996 | Yammine et al. ............ 395/182.13 |
| 5,566,297 | 10/1996 | Devarakonda et al. ............ 395/182.13 |
| 5,583,856 | 12/1996 | Weir ............ 370/359 |
| 5,594,863 | 1/1997 | Stiles ............ 395/182.13 |
| 5,625,819 | 4/1997 | Hoffer, Jr. ............ 707/202 |
| 5,640,448 | 6/1997 | Toyoshima ............ 379/165 |
| 5,787,493 | 7/1998 | Niijima et al. ............ 711/204 |
| 5,832,515 | 11/1998 | Ledain et al. ............ 707/202 |
| 5,862,083 | 1/1999 | Tobita et al. ............ 365/185.09 |

OTHER PUBLICATIONS

Semiconductor Memories: A Handbook Of Design, Manufacture, And Application (2d ed. 1991) (pp. 537 and 398–90).

*Primary Examiner*—Ruay Lian Ho
*Attorney, Agent, or Firm*—Robert E. Bushnell, Esq.

[57] ABSTRACT

A device and method for recovering data in a file system. The method includes the steps of performing a given function that effects a change in a control structure of the file system and concurrently saving data relevant to the function in a state as data for a recovery, and recovering the interrupted function by using the data saved for a recovery, to prevent the loss of file data and maintain the consistency of the file system. The device includes a flash memory to store the control structure.

18 Claims, 7 Drawing Sheets

| OFFSET | | SECTOR | DIR NO |
|---|---|---|---|
| 0 | DISK INFORMATION AREA (4K) | 0 | |
| 4K | F/W INFORMATION AREA (4K) | 1 | |
| 8K | F/W HISTORY AREA (1K *32 =32K) | 2 | |
| 40K | FAT (8M/4K*2=4K) | A | |
| 44K | SYSTEM PROGRAM DIR (8K/32=256ENTRY) | B | 00h |
| 52K | SYSTEM COMMAN DIR (8K/32=256ENTRY) | D | 01h |
| 60K | SYSTEM NODE0 DIR (8K/32=256ENTRY) | F | 02h |
| ⋮ | ⋮ | ⋮ | 09h |
| | SYSTEM NODE7 DIR (8K/32=256ENTRY) | | |
| 124K | FW01_A DIR (4K/32=128ENTRY) | 1F | 10h |
| | FW01_B DIR (4K/32=128ENTRY) | | |
| ⋮ | ⋮ | ⋮ | |
| | FW32_A DIR (4K/32=128ENTRY) | | 4Fh |
| | FW32_B DIR (4K/32=128ENTRY) | | |
| 380K | RESERVED AREA (4K *5 =20K) | 5F | |
| 400K | | 64 | |
| | GENERAL DATA AREA (8M-400K=7.6M) | | |
| 8M | | | |

FIG. 2

| OFFSET | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| CLUSTER 0 | 00h | 01h | EEh | EEh | 00h | 03h | 00h | 04h | EEh | EEh | FFh | FFh | FFh | FFh | FFh | FFh |
| 10h | | | | | | | | | | | | | | | | |
| 20h | | | | | | | | | | | | | | | | |
| ⋮ | | | | | | | | | | | | | | | | |
| | FFh | FFh | FFh | FFh | FFh | FFh | DDh | DDh | DDh | DDh | DDh | DDh | DDh | DDh | DDh | DDh |

FIG. 3

DEVICE AND METHOD FOR DATA RECOVERY IN A FILE SYSTEM

This application makes reference to, incorporates the same herein, and claims all benefits accuring under 35 U.S.C. §119 from an application for METHOD OF DATA RECOVERY IN FILE SYSTEM earlier filed in the Korean Industrial Property Office on the 13th day of August 1996 and there duly assigned Ser. No. 1996-33622, a copy of which application is annexed hereto.

BACKGROUND OF THE INVENTION

1. Field of the Invention

The present invention relates to a file system characterized by a control structure such as a file allocation table and a directory tree and, more particularly, to a device and method for recovering data in a file system when the computer on which the file system is maintained is restarted due to errors. Specific examples presented herein apply particularly to file systems characterized by file allocation tables. However, persons of skill in the computer arts will understand that the present invention encompasses data recovery in a wide variety of modern computer systems and file systems used therein.

2. Description of the Related Art

A file allocation table (FAT) and associated directories are used for the convenience of users of a computer system, such as a communications switching system (i.e., a PBX or keyphone system), that employs a file management system to manage large-capacity files. When a fatal error occurs in the course of processing files, the computer system must be restarted by means of a software or hardware operation (by pressing a power-on switch twice or pressing a reset button, for example). A restart operation that occurs when the FAT or a directory is being changed may lead to an anomalous situation: the data processed before the restart operation remains available, but consistency is not assured for the data related to the FAT or the directory being changed.

When the computer system is restarted, the file system may fall out of consistency with respect to the storage state of management information maintained for controlling the overall file system. This inconsistency may result in the loss of file data and, most undesirably, in an interruption of services of the computer system. Such an interruption may amount to only an inconvenience in some situations involving only general personal computers. However, it presents a major problem for mission-critical systems and particularly for switching systems that are required to provide continuous service with high reliability. System reliability is substantially reduced if service may be suspended after a restart operation due to the loss of essential programs and data required for system operation.

The critical problem of recovering file system control structure data upon restarting the system has generated three general types of solutions. U.S. Pat. No. 5,561,795 provides an example of the first type, wherein the file system maintains an ongoing log of file system transactions. This approach has seen success in a variety of contexts, but it has the drawback that with large file systems a long and complex procedure may be required to reconstruct the file system control structure. An even more serious limitation is that transaction logging may not ensure recoverability of corrupted control structure data. Both of these features make transaction logging of only limited usefulness for data recovery in mission-critical systems such as switching systems.

A second approach to data recovery is exemplified by U.S. Pat. No. 5,504,883, entitled "METHOD AND APPARATUS FOR INSURING RECOVERY OF FILE CONTROL INFORMATION FOR SECONDARY STORAGE SYSTEMS" and issued Apr. 2, 1996 to Coverston et al., the disclosure of which is incorporated herein by reference. Here a pair of disk drives is used to back up control information from cache memory on a periodic basis. Each of the disk drives writes a time control stamp immediately before and after writing the current control structure to disk. If the system is restarted, the recovery system compares the four control stamps (one before and one after the copy of the control structure on each of the disks) to identify an intact copy of the control structure. Two storage devices are needed in this approach to ensure that an intact copy of the control structure remains in storage even while the file system is updating the other copy.

The elegant solution provided by the '883 patent has certain features that unfortunately limit its usefulness for mission-critical, high performance systems such as switching systems. First, it requires redundant disk storage devices that increase the overall cost of the computer system in which it is implemented. Such storage devices, even with modern designs, have relatively slow access times and require a separate controller to control the interface between the storage device and the rest of the computer system. More seriously, recovery of control structure data from backup files entails an inherent performance tradeoff: more frequent backups drive up the system's management overhead, and fewer backups risk catastrophic data loss. Such compromises are desirably avoided in application environments that require both high reliability and high performance.

The use of flash memories (or FEPROMs) has been suggested as a way to avoid the disadvantages of dual mass storage devices while retaining the benefits of redundant storage of critical data. For example, U.S. Pat. No. 5,432,927, entitled "FAIL-SAFE EEPROM BASED REWRITABLE BOOT SYSTEM," issued Jul. 11, 1995 to Grote et al., the disclosure of which is incorporated herein by reference, shows a boot sequence reprogramming system using dual flash memories. Flash memory is a recently-developed EEPROM technology suitable for an expanded range of applications because it allows numerous rewrites. The '927 patent shows a successful application for redundant storage of an effective boot sequence routine while an updated boot sequence routine is loaded.

On the other hand, writing to a flash memory still requires elevated voltages, as with traditional EEPROM devices, and the design complications that those elevated voltages entail. Moreover, U.S. Pat. No. 5,392,427, entitled "SYSTEM FOR UPDATING DATA STORED ON A FLASH-ERASABLE, PROGRAMMABLE, READ-ONLY MEMORY (FEPROM) BASED UPON PREDETERMINED BIT VALUE OF INDICTING POINTERS" and issued Feb. 21, 1995 to Barrett et al., the disclosure of which is incorporated herein by reference, illustrates some of the complications that arise when using flash memories for frequently-updated data storage. Most seriously, mere replacement of mass storage devices with flash memory devices will not avoid the overhead-data loss tradeoff problem inherent to redundancy systems.

A third, promising approach to data recovery was proposed in U.S. Pat. No. 4,164,017, issued Aug. 7, 1979 to Randell et al. The disclosed apparatus runs a program that is divided into program blocks. Data that will be changed by the execution of a given block is backed up in memory prior to execution of the block. The basic idea of process segmentation provides a potential alternative to data recovery through storage redundancy, but the '017 patent does not explain how that idea might be implemented to overcome the problems associated with reliable recovery of file allocation data. In particular, it does not show how to restore a file control structure to consistency when consistency has been lost due to the occurrence of a restart event while the file control structure was being modified.

The '017 patent also does not show how process segmentation might be used with advanced semiconductor devices to overcome the problems of control structure data recovery. Indeed, much of the currently available semiconductor technology, including flash memories and high-capacity (1 Mb or higher) SRAMs, did not exist when the '017 patent was granted. See generally Betty Prince, SEMICONDUCTOR MEMORIES: A HANDBOOK OF DESIGN, MANUFACTURE, AND APPLICATION (2d ed. 1991), the disclosure of which is incorporated herein by reference. Specific attention is directed to pages 537 and 398–90 of this reference.

An application of the idea presented in the '017 patent has been proposed in U.S. Pat. No. 5,564,011, entitled "SYSTEM AND METHOD FOR MAINTAINING FILE DATA ACCESS IN CASE OF DYNAMIC CRITICAL SECTOR FAILURE" and issued Oct. 8, 1996 to Yammine et al., the disclosure of which is incorporated herein by reference. This system protects against data loss from failure of certain critical disk sectors, which contain file management data, by storing enough information in main memory to allow at least partial recreation of the critical sector data. If the file system detects that a critical sector has failed, it can create at least a partial image of the sector in memory from data read at initialization and at updates.

The ability to recover the control structure state that existed just prior to the occurrence of an error would effectively address the overhead-data loss tradeoff problem of redundancy systems. But the system of the '011 patent unfortunately may only provide partial recovery of the data stored in an affected disk sector. Also, the disclosed system relies upon data stored in main memory to perform this recovery, and this data would be lost if power to the computer system failed. Redundancy systems at least provide the assurance that a usable data structure can be recovered. Data regeneration as provided by this patent therefore would not adequately address the data recovery needs that exist for file systems required to provide high performance and high reliability.

We have found, in fact, that a need exists for an efficient and reliable alternative to redundancy-based data recovery systems. Such an alternative would avoid the overhead and reliability drawbacks of redundancy systems. It should also reliably allow recovery of data after any of the full range of possible error conditions, including total interruptions of power to the computer system. Desirably, it would enable recovery of a faithful copy of the system's control structure as it existed just prior to the condition that necessitated restarting the system. Ideally, its data safekeeping operations would add only modestly to the operational overhead of the file system.

SUMMARY OF THE INVENTION

An objective of the present invention is to provide a device and a method for recovering data processed in the file system of a computer system when the computer system is restarted.

Another object of the present invention is to provide such a device and method that will enable the file system to maintain consistency of management data storage in the file system.

Still another object of the present invention is to provide such a device and method for preventing the loss of file data when a computer system is restarted.

A further object of the present invention is to provide such a device and method enabling normal service of a file system when the computer system on which it is maintained is restarted.

These and other objects are achieved by the present invention, which provides in a first aspect a device for data recovery comprising a flash memory coupled to a computer system, a nonvolatile memory also coupled to the computer system, and a processing unit coupled to the flash memory and the nonvolatile memory. The flash memory includes an area for storing a control structure used by a file system of the computer system. The nonvolatile memory includes a predetermined area for storage of recovery step flag, and it stores recovery data including data contained in the recovery step flag. The processing unit is adapted to store in the predetermined area of the nonvolatile memory a mark indicating a position of the recovery step flag corresponding to a specified step of a file management task being executed by the file system. The mark represents completion of the specified step by the file system.

In a second aspect, the present invention provides a method for recovering data, comprising the step of performing a specified step of a file management task for a file system of a computer system, with the file management task effecting a change to a control structure of the file system and being defined by a predetermined procedure including the specified step. The method also includes the step of storing in a predetermined area of a nonvolatile memory a mark indicating a position of a recovery step flag stored in the predetermined area, with the position corresponding to the specified step, with the mark representing completion of the step, and with the nonvolatile memory being coupled to the computer system. The method also includes the step of re-entering the predetermined procedure at a step subsequent to the specified step and completing the file management task to effect the change to the control structure when a restart event interrupts the file management task after the mark has been stored.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein:

FIG. 2 is a diagram showing the structure of the flash memory shown in FIG. 1;

FIG. 3 is a detailed diagram of the file allocation table of the flash memory shown in FIG. 2;

DETAILED DESCRIPTION OF THE PREFERRED EMBODIMENT

Figure 1:
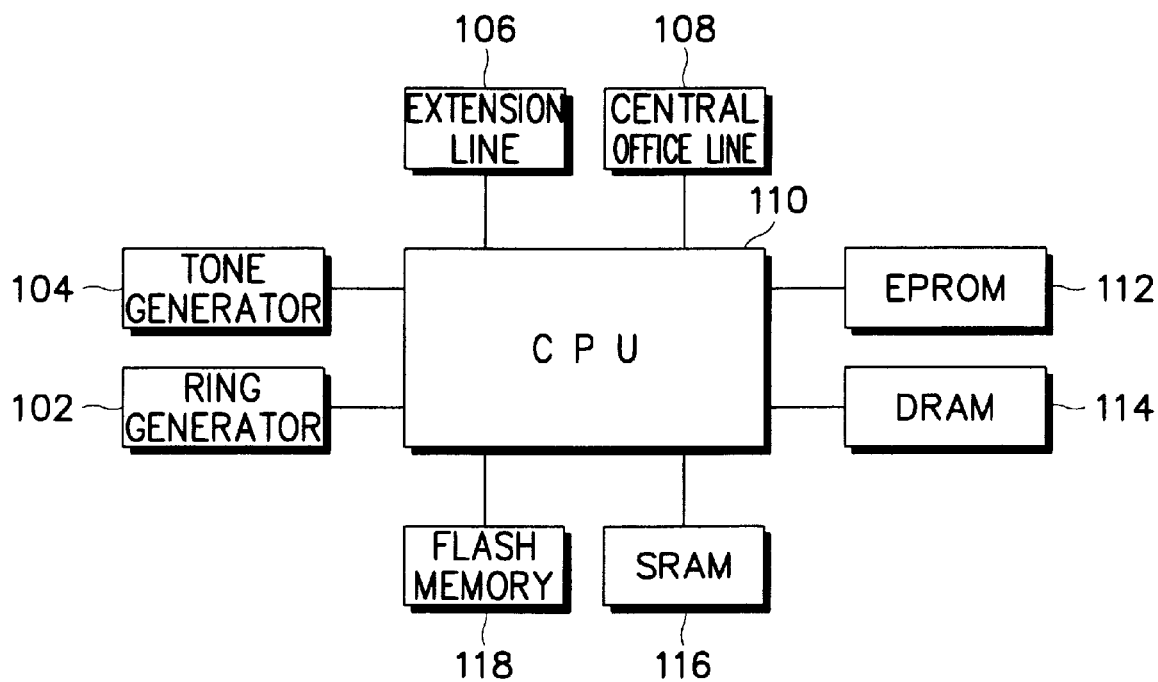
FIG. 1 is a block diagram of a switching system in accordance with the present invention.

FIG. 1 is a block diagram of a switching system 100 in accordance with the present invention. Switching system 100 includes a flash memory as an auxiliary storage. The file system of switching system 100 uses several 1-level file directories located in a predetermined position in the system area without a root directory. Each of these file directories is so simplified that it contains no subdirectories, but only files. It should be noted that FIG. 1 is not intended to be a limiting depiction of the present invention, but rather to illustrate, in simplified form, a typical application context. The illustrative system of FIG. 1 includes several features specifically directed toward the characteristics of a communications switching system, but these also are intended to be illustrative and not limiting.

Switching system 100 comprises a ring generator 102, a tone generator 104, an extension line 106, a central office line 108, and a central processing unit (CPU) 110, which are typically included in the construction of a general switching system. CPU 110 is connected to an erasable and programmable read only memory (EPROM) 112, a dynamic random access memory (DRAM) 114, and a Static Random Access Memory (SRAM) 116, which store program data to operate switching system 100 as well as other data processed therein. Also included in switching system 100 is a flash memory 118, which is shown in greater detail FIG. 2.

An example of a switching system using a flash memory is disclosed in U.S. application Ser. No. 08/902,356 entitled "Technique for Managing Files in Telephone Switching System" and filed Jul. 29, 1997 by Jung-Gi Kim, earlier filed in the Korean Industrial Property Office on the 29th day of July 1996 and there assigned Ser. No. 1996/31348, the same being commonly assigned with the present application and the disclosure of which is incorporated herein by reference. As described in the Kim application, the flash memory in such a system can perform many of the functions of a mass storage device such as a disk drive. On the other hand, because flash memories are byte addressable, rather than block addressable as with disk storage devices, file updating operations can be performed on a flash memory with much more efficient use of available storage area. Access times for flash memories are comparable to other memory devices, and so updates on a flash memory "pseudodisk" can be performed much faster than on a conventional mass storage device.

FIG. 2 shows flash memory 118 as having, for example, sector size is 4 Kb, cluster size 4 Kb, system sector size 400 Kb, general sector size 7.6 Mb, and 8 Mb of total capacity. In particular, flash memory 118 as shown in FIG. 2 comprises a pseudodisk information area from 0 to 4 Kb, an F/W information area from 4 Kb to 8 Kb, an F/W history area from 8 Kb to 40 Kb, an FAT (File Allocation Table) from 40 Kb to 44 Kb, a system program directory from 44 Kb to 52 Kb, a system common directory from 52 Kb to 60 Kb, a system node directory from 60 Kb to 124 Kb, an FM directory (FW01__A Dir.~FW32__B Dir) from 124 Kb to 380 Kb, a reserved area from 380 Kb to 400 Kb, and a general data area from 400 Kb to 8 Mb.

FIG. 3 provides a detailed view of the FAT in flash memory 118 of FIG. 2. The FAT manages files in units of clusters by storing information concerning the links between the clusters. Referring to FIG. 3, the FAT is initialized with values FFH indicating free clusters. EEEEh denotes an end cluster which is the end of a link. DDDDh (Does Not Exist Cluster) indicates a cluster that does not exist physically. BBBBh (Bad Cluster) denotes that an error exists with respect to the cluster concerned. The other values depicted represent the numbers of the corresponding linked clusters.

A file system having a flash memory constructed as shown in FIGS. 2 and 3 performs at least four basic functions: a sector read/write function, to read or write desired data to or from a designated sector in the flash memory; a file read/write function, to read to or write from a file in the flash memory identified by a designated file name; a file delete function, to delete from the flash memory a file having a designated file name; and a directory list function, to obtain information concerning the files existing in a designated directory, such as file name, load position, size, data, attributes, and the like.

A method of recovering file data according to the present invention is applicable when a computer system such as switching system 100 is restarted by software or hardware in the course of processing data. In the course of performing its various functions, such as sector write, file write, or file delete functions, the file system of switching system 100 generates data for use in a potential recovery operation. This data must be stored in an area where it can be maintained with the system power off and recovered when the system is restarted. Therefore, the information needed for control structure data recovery is stored in SRAM 116. Accumulation of this information occurs in a step is by step process during normal execution by the file system. The method of the present invention allows the file system's control structure (such as a FAT) to be recovered from the information stored in SRAM 116 when the system is restarted.

Figure 4:
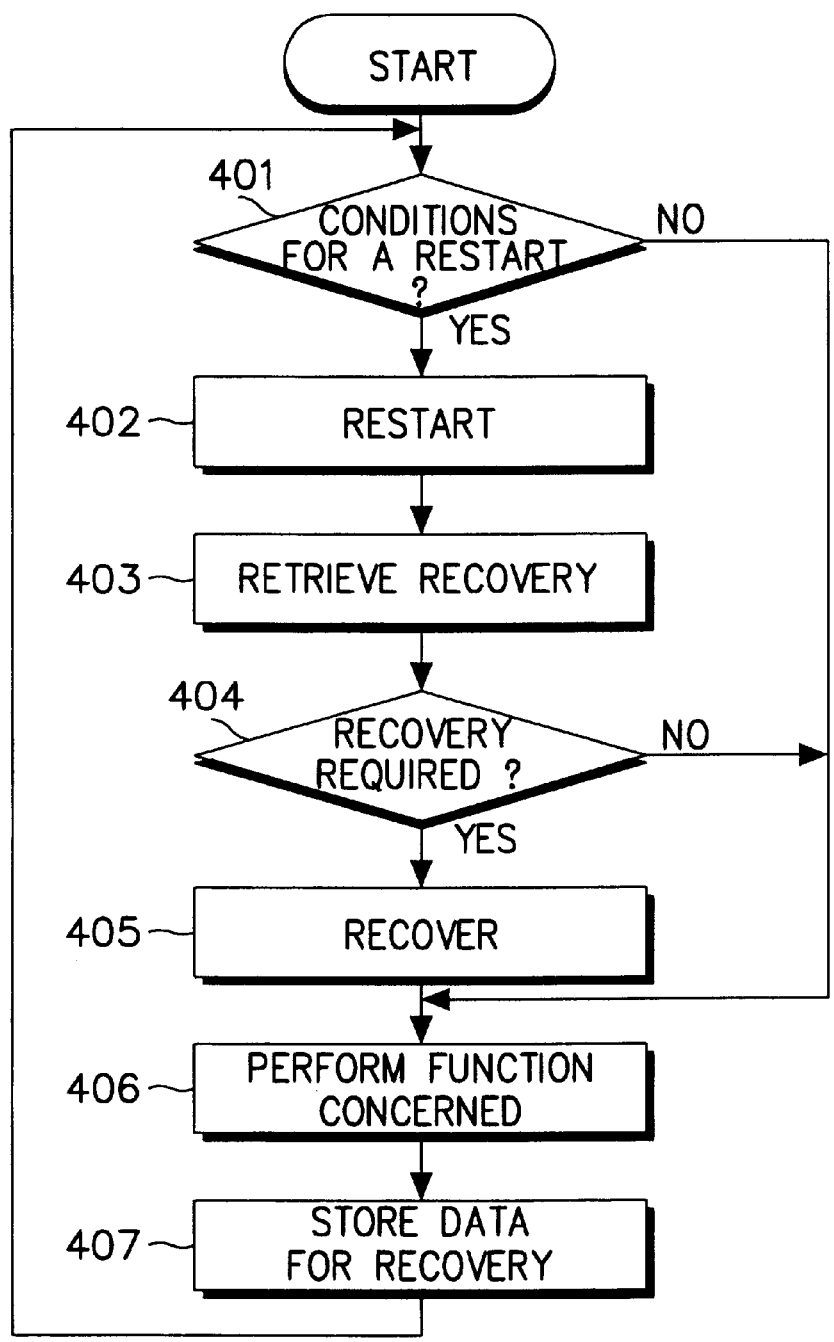
FIG. 4 is a flow diagram illustrating the processing operation of a file system in accordance with the present invention.

FIG. 4 is a flow diagram illustrating an operating cycle for a file system in which data recovery in accordance with the present invention occurs. Referring to FIG. 4, the file system continuously executes a cycle of checking at step 401 for an abnormal condition that would necessitate a restart operation and, if normal operation is detected, performing a given function at step 406. Data generated in the course of performing the function is stored in SRAM 116 at step 407. Safe storage of this data in nonvolatile memory enables the file system to undertake data recovery if the system must subsequently be restarted.

Through storage step 407 the file system records a temporary work history, i.e., temporarily "shows its work" in executing a file management function. This work history allows the system to recover file allocation data for the operating state in which an error arose that required a restart operation. The file system can accumulate a work history as it executes a file management function because each of the file management functions is logically fractionated into a sequence of processing steps. These steps will be discussed below with reference to FIGS. 5–7.

If at step 401 the file system detects an abnormal condition requiring a restart operation, then at step 402 it executes appropriate instructions to initiate restart. Once the system is restarted (by software or hardware), the file system executes a retrieval operation at step 403 to retrieve data that may be required for recovery from the restart event. At step 404 the file system determines whether file allocation data recovery is required. If the restart occurred while the file system was performing a file management function, then at step 405 the file system recovers lost file allocation data by accessing the data accumulated in SRAM 116.

Figure 5:
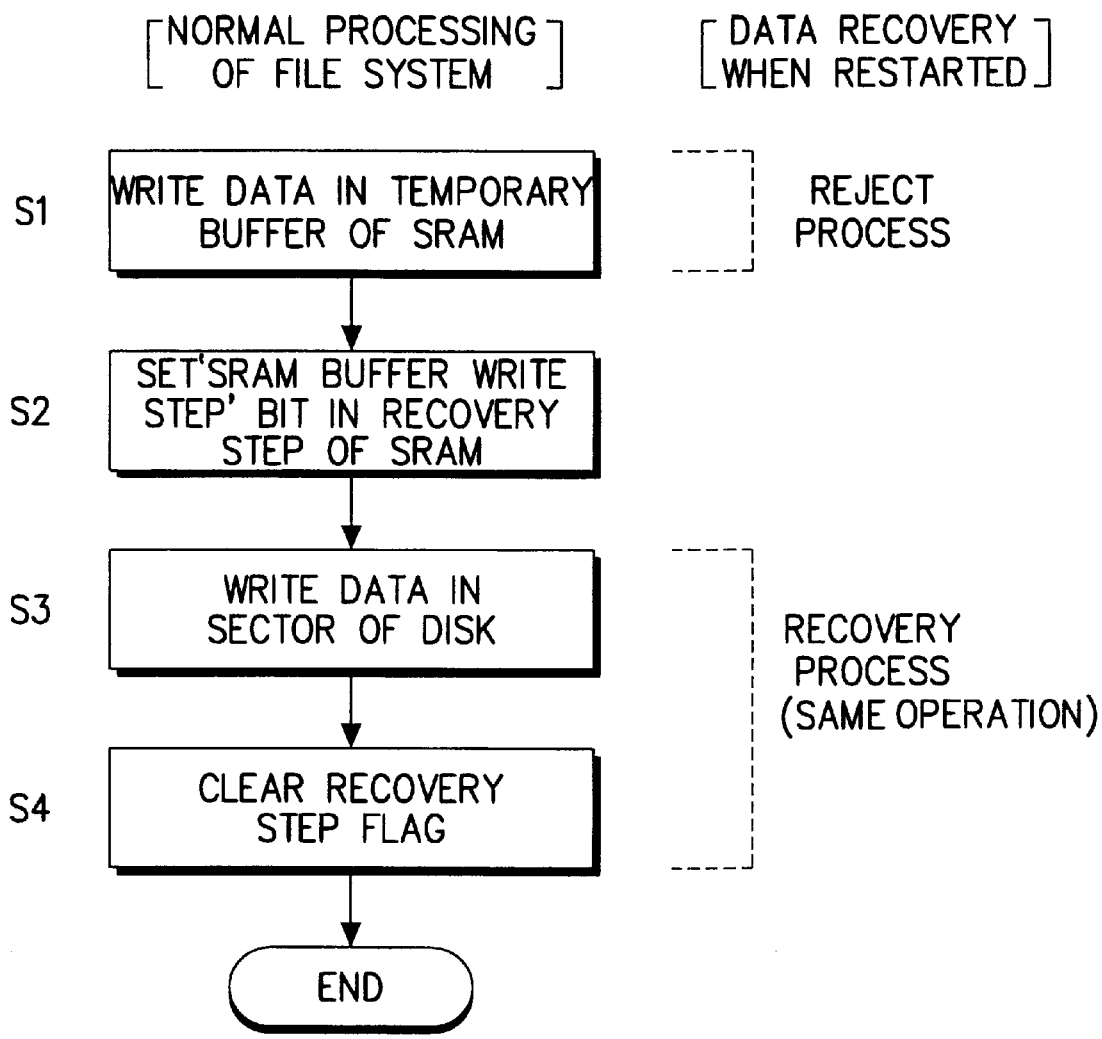
FIG. 5 is a flow diagram illustrating a method of data recovery for a file system during execution of a sector write function in accordance with the present invention.
Figure 6:
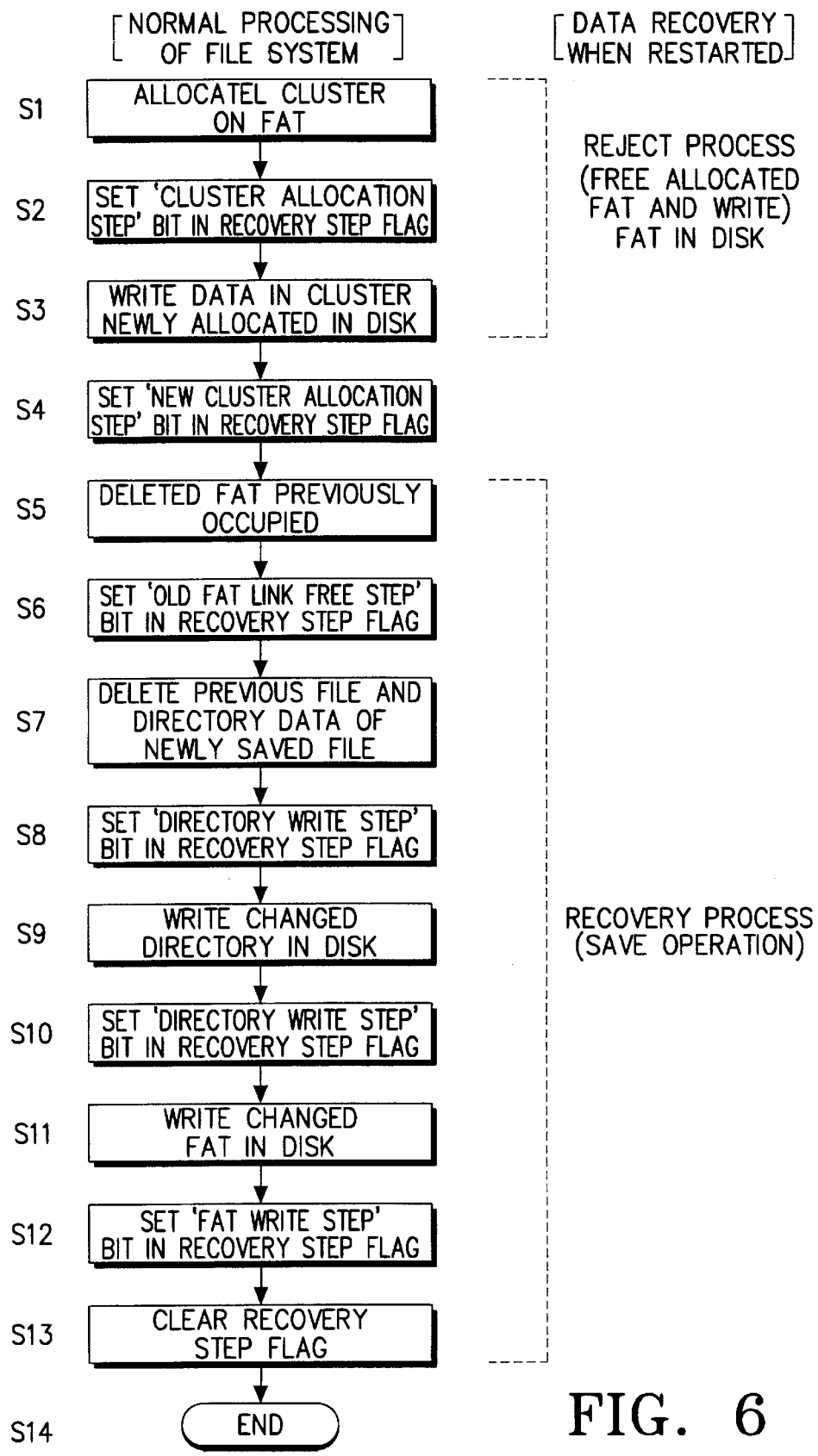
FIG. 6 is a flow diagram illustrating a data recovery method for a file system during execution of a file write function in accordance with the present invention.
Figure 7:
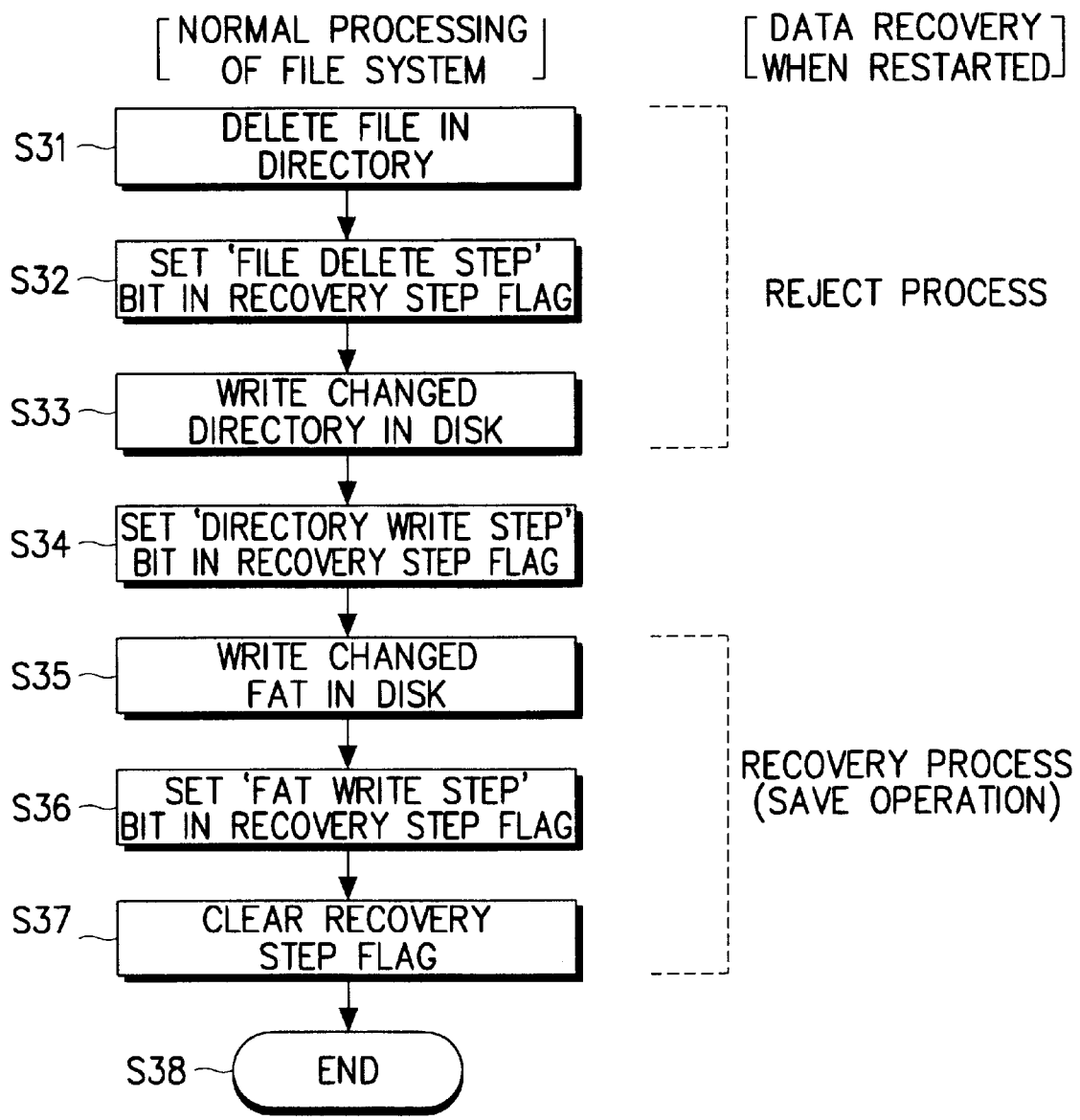
FIG. 7 is a flow diagram illustrating a data recovery method for a file system during execution of a file delete function in accordance with the present invention.

Generally, data recovery will be required only after a restart event that occurred while the file system was performing a file management operation that involved modification of file allocation data, ie., a change in the file control structure. Three of the basic file management functions involve file allocation data modification: the sector write function, the file write function, and the file delete function. FIGS. 5–7 illustrate the work history accumulation steps and the data recovery process corresponding to each one of these respective functions.

FIG. 5 illustrates work history accumulation and data recovery by the file system with respect to the sector write function. In performing a sector write operation, the file system at step S1 first writes the data into a temporary buffer provided in SRAM 116. At step S2 an SRAM buffer write step bit is set in a recovery step flag. The setting of this flag bit logically fractionates the sector write function into a pre-flag portion and a post-flag portion. After the flag bit is set, the file system proceeds at step S3 to write the data to be stored into the specified sector of the flash memory. If write step S3 is accomplished without a restart interruption, then at step S4 the file system clears the recovery step flag and completes the sector write operation at step S5.

Data recovery for the sector write function occurs in accordance with the present invention as follows, with reference to FIGS. 4 and 5. When a restart event occurs in the post-flag portion of the sector write function, the file system at step 403 retrieves the sector data previously stored in SRAM 116. at step 404 the file system detects the presence of the flag set at step S2 of Fig. S and thereby determines that data recovery is required. To carry out recovery at step 405, the file system omits the pre-flag portion of the sector write function and instead proceeds immediately to the processing steps subsequent to step S2. This sequence of operations accomplishes data recovery for the file system by correctly completing the sector write function that was interrupted by the restart event.

FIG. 6 similarly illustrates work history accumulation and data recovery with respect to the file write function. In carrying out a file write operation, the file system at step S11 allots, by reference to the FAT, a cluster on which to store the file data. At step S12 a 'cluster allocation step' bit is set in the recovery step flag. The data to be stored is then written at step S13 into the flash memory at the newly allotted cluster. If the write operation entails overwriting a previously stored file, then at step S14 the file system sets a new cluster allocation step bit in the recovery step flag.

At step S15 the file system cancels from the FAT the cluster allocation previously occupied by the overwritten file. At step S16 an 'old FAT link free step' bit is set in the recovery step flag. At step S17 the file system deletes indication of the overwritten file from the directory and adds an indication of the newly saved file to the directory and, at step S18, it sets a 'directory update step' bit in the recovery step flag. At step S19 the system writes the changed directory into the flash memory and, at step S20, a 'directory write step' bit in the recovery step flag is set. The changed FAT is then written to the flash memory at step 21, followed at step 22 by an 'FAT write step' bit being set in the recovery step flag. The file system then clears the recovery step flag at step S23 and completes the file write operation at step S24.

When a restart event occurs during a file write operation, the file system steps through the procedure of FIG. 4 just as with the sector write operation of FIG. 5. At step 404 the file system determines whether recovery is required by checking the status of the recovery step flag. If one or more of the step bits is set, then the file system proceeds directly to step following the last set bit. For example, if a restart event had occurred after the file system had set the hew cluster allocation step 'bit at step S15 but not the old FAT link free step' bit, then upon recovery the system would re-enter the file write function at step S15, skipping steps S11–S14. In this way, the file system executes upon recovery only that part of the FAT updating procedure that was interrupted by the restart. Correct file allocation data corresponding to the file write operation can therefore be recovered in a rapid and reliable manner.

FIG. 7 illustrates, in like manner, history accumulation and data recovery for the file delete function. A file delete operation proceeds by deleting from the directory the indication of the file to be discarded, at step S31. A 'file delete step' bit is set at step S32 in the recovery step flag. At step S33 the file system writes the changed directory to the flash memory, and at step S34 it sets a 'directory write step' bit in the recovery step flag. After writing the changed FAT to the flash memory at step S35, the file system at step S36 sets an 'FAT write step' bit in the recovery step flag. The file system then clears the recovery step flag at step S37 and completes the file delete operation at step S38.

When the file system is restarted during a file delete operation, it proceeds in accordance with the method illustrated in FIG. 4, just as it does after a restart during a sector write or a file write operation. If a set bit is detected in the recovery step flag at step 404, then the system executes recovery by re-entering the file delete procedure at the step following the step where the last bit was set. For example, if the file system determines that the 'file delete step' bit and the 'directory write step' bit are set but the 'fat write step' bit is not set, then upon re-entering the procedure it skips over steps S31–S34 proceeds directly with step S35 and subsequent steps. The work history of the file management operation, as represented in the accumulation of set bits in the recovery step flag, therefore allows the file system to cover control structure consistency by correctly completing the file management task that was interrupted by the restart event.

As described above, a file system according to the present invention recovers data after a restart operation in order to prevent the loss of file data and to maintain its consistency. It does this by maintaining its control structure, such as a FAT, in a flash memory and accumulating a work history in nonvolatile storage, such as an SRAM, to show its progress in executing a file management task. This work history allows the system to recover consistency without relying upon redundant storage of its control structure. The set bits of the recovery step flag indicate the precise point at which the file system should re-enter the interrupted task in order to complete a control structure update correctly. This approach allows the system to recover a consistent and current file structure, rather than relying upon a consistent but potentially outdated structure taken from mass storage.

Storage of the recovery step flag in nonvolatile memory, such as an SRAM, provides enhanced reliability of the recovery system compared with a recovery system that stores recovery data in main memory. A system according to the present invention can recover the current file structure, even if power is lost to the system's volatile memory. In addition, combination of the SRAM with a flash memory to store the control structure enhances the system's performance by eliminating the long access delays inherent to mass storage devices. The present invention also provides the advantage of enabling the file system to recover file allocation data autonomously, i.e., without resort to external tools.

It should be understood, in view of the foregoing disclosure, that the present invention is not limited to the particular embodiment disclosed herein as the best mode contemplated for carrying out the present invention. Similarly, the present invention is not limited to the specific embodiments described in this specification, except as defined in the appended claims.

What is claimed is:

1. A device for data recovery, comprising:

a flash memory coupled to a computer system and including an area for storing a control structure used by a file system of said computer system;

a nonvolatile memory coupled to said computer system for storing recovery data, with said recovery data including data contained in a recovery step flag and with said nonvolatile memory including a predetermined area for storage of said recovery step flag; and a processing unit coupled to said flash memory and to said nonvolatile memory and selectively storing in said predetermined area of said nonvolatile memory a mark indicating a position of said recovery step flag corresponding to a specified step of a file management task being executed by said file system, with a corresponding said mark representing completion of a corresponding said specified step of said file management task by said file system.

2. The device of claim 1, wherein said nonvolatile memory is a static random access memory.

3. The device of claim 1, wherein said processing unit is a central processing unit of said computer system.

4. The device of claim 1, wherein said computer system is a switching system.

5. The device of claim 1, wherein said flash memory further includes an area for storing general data.

6. The device of claim 1, wherein said control structure includes a file allocation table.

7. The device of claim 1, wherein said flash memory, said nonvolatile memory, and said processing unit are incorporated in said computer system.

8. The device of claim 1, wherein said file management task includes a plurality of steps and said recovery step flag includes a plurality of positions each indicated by a corresponding said mark, with each one of said plurality of positions corresponding to one of said plurality of steps of said file management task.

9. A method for recovering data, comprising the steps of:

performing a specified step of a file management task for a file system of a computer system, with said file management task effecting a change to a control structure of said file system and being defined by a predetermined procedure including said specified step;

storing in a predetermined area of a nonvolatile memory a mark indicating a position of a recovery step flag stored in said predetermined area, with said position corresponding to a corresponding said specified step, with a corresponding said mark representing completion of a corresponding said specified step, and with said nonvolatile memory being coupled to said computer system; and re-entering said predetermined procedure at a step subsequent to a last completed said specified step indicated by a corresponding said mark and completing said file management task to effect said change to said control structure when a restart event interrupts said file management task after a corresponding said mark has been stored.

10. The method of claim 9, wherein said predetermined procedure of said file management task includes a plurality of steps and said recovery step flag includes a plurality of positions each indicated by a corresponding said mark, with each one of said plurality of positions corresponding to one of said plurality of steps.

11. The method of claim 9, further including the step of retrieving recovery data from said nonvolatile memory when a restart event has occurred, with said recovery data including said recovery step flag.

12. The method of claim 11, further comprising the step of determining from said recovery data whether data recovery is required to return said control structure to consistency.

13. The method of claim 12, wherein data recovery is determined to be required when said restart event has interrupted said file management task after a corresponding said mark has been stored.

14. The method of claim 9, wherein said control structure includes a file allocation table.

15. The method of claim 9, wherein said control structure is stored in a flash memory coupled to said computer system.

16. The method of claim 9, wherein said computer system is a switching system.

17. The method of claim 9, wherein said nonvolatile memory is a static random access memory.

18. The method of claim 9, wherein said file management task is a task selected from the group consisting of a sector write function, a file write function, and a file delete function.

* * * * *